United States Patent [19]

Serrano

[11] Patent Number: 5,118,918
[45] Date of Patent: Jun. 2, 1992

[54] BEAM DELIVERY APPARATUS

[76] Inventor: Jean-Pierre Serrano, Mas du Doudon, Quartier de la Douane, Cassis, France, 13260

[21] Appl. No.: 458,729
[22] PCT Filed: Jun. 5, 1989
[86] PCT No.: PCT/EP89/00626
  § 371 Date: Feb. 2, 1990
  § 102(e) Date: Feb. 2, 1990
[87] PCT Pub. No.: WO89/11949
  PCT Pub. Date: Dec. 14, 1989

[30] Foreign Application Priority Data

Jun. 6, 1988 [GB] United Kingdom ............... 8813315

[51] Int. Cl.⁵ .......................................... B23K 26/02
[52] U.S. Cl. ......................... 219/121.78; 219/121.74; 219/121.84; 219/121.83
[58] Field of Search ............... 219/121.78, 121.29, 219/121.74, 121.8, 121.83, 121.84, 121.6, 121.85

[56] References Cited

U.S. PATENT DOCUMENTS

| 3,619,550 | 11/1971 | Matthews | 219/121.6 |
| 4,465,919 | 8/1984 | Roder | 219/121.67 |
| 4,533,814 | 8/1985 | Ward | 219/121.64 |
| 4,539,462 | 9/1985 | Plankenhorn | 219/121.79 |
| 4,572,941 | 2/1986 | Sciaky et al. | 219/121.64 |
| 4,633,058 | 12/1986 | Jones | 219/121.7 |
| 4,638,143 | 1/1987 | Akeel | 219/121.74 |
| 4,667,081 | 5/1987 | Turin et al. | 219/121.79 |
| 4,694,139 | 9/1987 | Roder | 219/121.78 |
| 4,698,479 | 10/1987 | Rando et al. | 219/121.79 |
| 4,703,157 | 10/1987 | Dahlquist | 219/121.78 |

FOREIGN PATENT DOCUMENTS

| 883456 | 10/1971 | Canada . | |
| 0238171 | 9/1987 | European Pat. Off. . | |
| 0054487 | 3/1984 | Japan | 219/121.83 |
| 0077193 | 4/1987 | Japan | 219/121.78 |
| 0156090 | 7/1987 | Japan | 219/121.83 |
| 0187588 | 8/1987 | Japan | 219/121.84 |
| 2074084 | 10/1981 | United Kingdom . | |

OTHER PUBLICATIONS

IBM Technical Disclosure Bulletin, vol. 22, No. 10, Mar. 1980, Laser Formation of Disks Using a Beamsplitter, A. W. Mueller, pp. 4723 and 4724.

Primary Examiner—C. L. Albritton
Attorney, Agent, or Firm—McFadden, Fincham, Marcus & Anissimoff

[57] ABSTRACT

There is disclosed a laser beam delivery apparatus comprising a laser (10) having an axis (14), a first mirror (13) at one end of the laser (10) and adapted to reflect the beam normal to the laser axis (14), a second mirror (15) aligned with the first mirror (13), the second mirror (15) adapted to reflect the beam along a further axis (16), a telescopic means (30) joining the first and second mirrors (13, 15), a third mirror (19) aligned with the second mirror (15) and a focusing means (33) associated with the third mirror (19) for focusing the beam on a workpiece. Also disclosed is a sensing means (63) for sensing the distance of a focusing head (33) of a laser delivery system above a workpiece to be subjected to the action of the laser beam.

16 Claims, 8 Drawing Sheets

BEAM DELIVERY APPARATUS

This application relates to beam delivery apparatus, particularly to a laser beam delivery apparatus for use in acting on a workpiece.

Traditionally, in laser cutting, etching, and similar forms of apparatus, the laser is caused to move as part of the directing operation onto a workpiece.

PRIOR ART

In the prior art, various proposals have been made for formulating different techniques and representative of these is U.S. Pat. No. 4,638,143. In this reference, there is disclosed a robot-laser system which utilizes two or more mirrors mounted on an outer arm of the robot which moves the mirrors relative to the robot.

Another reference is U.S. Pat. No. 4,703,157 which again utilizes a robot with a rotatable wrist and discloses three mirrors inside the wrist of the robot arm to pass a light beam along the axis of rotation unrefracted through the wrist.

U.S. Pat. No. 4,694,139 discloses a laser guidance system whereby adjustment of equal swivelling angles, circular arc cuts can be made.

U.S. Pat. No. 4,539,462 discloses a complex laser delivery system again utilizing a robot where each segment of a robot's arm is associated with a segment of a beam in a defined spatial relationship.

U.S. Pat. No. 4,465,519 is similar to the above described references by providing for a hole cutting laser apparatus; this device utilizes a mold to permit relative motion between the laser and the mold to provide a cutting action along the edges of an aperture.

U.S. Pat. No. 4,533,814 discloses a laser pipe welder/cutter in which a delivery system is mounted for rotation about a fixed object to be cut. Rigid sections are employed for the device which employs an optical elbow joint.

U.S. Pat. No. 4,572,941 discloses a system in which a laser beam is directed to a static focusing means and uses the point of focus of a rotated beam for working purposes.

U.S. Pat. No. 4,667,081 discloses an articulated joint and utilizes a plurality of bearing means for rotating mirrors together with actuator means operating with the articulated joint to select various degrees of mechanical movement.

In all of the above prior art, various complex systems have been suggested for delivery of a laser beam through a point of use of the beam; in general, these have resulted in relatively expensive and complex equipment which in certain cases, has limited application or is intended specifically for certain functions whereby the equipment cannot be adapted for a variety of uses without significant modifications.

It would be desirable if there were provided a relatively economical laser device in which the necessity for complicated articulated joints or the like were reduced or minimized but at the same time still permitting an accurate delivery of the laser beam to its point of use, and which type of apparatus could be readily adapted for a variety of uses without complex modifications.

The present application maintains the laser stationery, providing an arrangement of movable mirrors, which have various forms of movement, such as rotation, movement along one axis and movement along another axis, the actual mirror movement being one or more of these forms of movement. Means are provided for ensuring correct optical alignment at all times.

Broadly, the invention is a beam delivery apparatus comprising a laser; first mirror means at the emission end of the laser and pivotal about the laser axis to reflect the beam normal to the laser axis; second mirror means aligned with the first mirror and pivotal about a further axis spaced from and parallel to the laser axis, and reflecting the beam along the further axis, the second mirror means also moveable transverse to the further axis; a telescopic arm joining the first and second mirror means to ensure movement in unison; a third mirror aligned with the second mirror, for transverse movement with the second mirror, and also moveable to and fro along the further axis. Focusing means are normally provided for focusing the beam on a workpiece.

In greater detail of the present invention, various types of lasers may be employed and the selection of a given laser will depend on parameters well known to those skilled in this art. For example, various types of $CO_2$ lasers may be used for cutting, welding or the like as well as "Yag" lasers, etc. The present invention has primary application to hot lasers designed for such cutting and welding applications.

In accordance with a teaching of the present invention, the first and second mirror means may be rotated in unison to maintain a laser beam delivered by the laser and to this end, a telescopic arm means is employed for this purpose. Both the first and second mirrors are provided with pivotable mounting means with direct or indirect means being associated with the respective mirrors and the telescopic means whereby on rotation or pivotal movement of one of the first and second mirrors, the other of said first and second mirrors rotates a corresponding degree of rotation or pivotal movement so that a laser beam will always be maintained in true and accurate alignment between the laser source and the point of delivery of the laser beam from the second mirror.

The telescopic means preferably comprises a telescopic arm in which one or more segments are movable within another arm segment. In a preferred form, a telescopic arm comprises a hollow cylindrical member in which one or more additional members are slidable, and in which there are provided mounting means for connecting directly or indirectly to the respective first and second mirror means.

In another preferred format, the telescopic means preferably comprises a hollow member adapted to permit transmission of a laser beam between the first and second mirror means; to this end, the telescopic means will thus not only serve to function as a means for effecting relative movement between the first and second mirrors but also for providing protecting means for enclosing the laser beam in a safe environment, particularly in the case of a hot laser beam.

In another embodiment, however, separate means may be provided for providing a protective shield for the path of the laser beam between the first and second mirror means and the telescopic means may form a separate component solely functioning to effect relative movement between the first and second mirror means.

The telescopic arm may be made of any suitable material; in the case of a telescopic linkage, suitable metallic or plastic materials may be employed and it will be understood that various telescopic linkages in this context may be used such as a guide sliding within another guide, a cylinder or rod sliding within another rod, etc.

Obviously, when the telescopic means is employed as a means for effecting rotation between the first and second mirrors, the guide means need not be hollow.

The focusing and mirror means employed in the apparatus of the present invention may be any suitable means; such means are well known by those skilled in this art.

In a particularly preferred form of the present invention, the apparatus includes a fixed work surface preferably in the form of a grid or the like and which for most purposes, will be in a generally horizontal plane. If desired, the work surface may include means for displacing the surface in a given plane to provide adjustment of the surface to accommodate workpieces of various heights.

Preferably, a housing is provided for mounting above the work surface, and which is movable in at least one direction relative to the work surface e.g. normal to the laser axis and which in turn is either the X or Y axis. The upper housing is preferably movable and means, such as motor means, e.g. servo motors, can be employed for this purpose to provide precision movement of the housing. The upper housing also preferably mounts internally said second mirror means; likewise, the upper housing preferably mounts the third mirror means, the latter of which is adapted to deliver the laser beam to the focusing means. The focusing means may or will normally be movable within a predetermined work range and suitable movable focusing means can be provided for this purpose.

The present invention may be used for various types of laser working such as cutting, welding, engraving, etc.

In another embodiment of the present invention, there is also provided a sensing means for sensing the distance of a focusing head above a workpiece to be subjected to the action of a laser beam. More particularly, according to this aspect of the invention, there is provided the improvement, in a laser delivery system, of pneumatic means adapted to be associated with said focusing means, means for creating a differential air pressure between said pneumatic means and a workpiece; means for sensing a difference in the air pressure or resistance of the air pressure; and means for comparing values generated by said means for sensing a difference in the air pressure to actuate movement of said focusing means in response to a change in distance between said focusing means and said workpiece; if desired it may be in combination with means for actuating movement of said focusing means in response to a change in distance between said focusing means and said workpiece in response to the difference in measurement of said air pressure resistance.

In a particularly preferred form, there is provided a pneumatic system adapted to feed a flow of air or other fluid against a workpiece, means for receiving a return flow of air, means for measuring the difference between the pressure of the first flow and the return flow, and for effecting relative movement of the focusing head relative to the workpiece whereby a constant distance may be maintained between the focusing head and the workpiece. An effective pneumatic device according to the present invention includes an outer cylindrical housing with a central hollow inner housing within said outer housing, the outer housing and the inner housing defining an air flow chamber adapted to feed a flow of air towards a workpiece; the hollow inner housing being adapted to receive a return air flow, and sensing means for sensing any variation in the pressure of the air flow. The sensing means will preferably provide a signal or comparative signal feed to controller means which in turn, will provide a signal to actuate device means to create relative movement between the focusing means and a workpiece in response to any variation in height of the focusing means relative to the workpiece.

In a particularly preferred embodiment, two or more pneumatic sensing means, preferably three, are employed mounted in a triangular relationship to each other to provide multidirectional control for the sensing head as normally, the sensing heads will be moved in a variable direction depending on the work being performed by the laser. In such an arrangement, the output references from the sensing means may be correlated by the controller means to provide the necessary multidirectional control of the sensing head.

Suitable means for supplying an air source to the sensing means will be provided; suitable motor means will likewise be provided for relative movement of the focusing means in a direction normal to the workpiece.

Operating in conjunction with the sensing means there may be provided suitable friction reducing means associated with the focusing means; this may take the form of e.g. ball bearings or the like mounted on the focusing head as normally, very close tolerances are required for the focusing head relative to the workpiece, particularly where irregular surfaces may be encountered.

Having thus generally described the invention, reference will now be made to the accompanying drawings illustrating preferred embodiments, and in which:

BRIEF DESCRIPTION OF DRAWINGS

As illustrated in FIG. 1, a beam transmission system comprises a laser 10, having an emission exit 11. The laser beam exiting at 11, indicated at 12, impinges on a first mirror or prism 13. Mirror 13 is mounted for pivotal movement about the axis 14 of the laser 10. The beam 12 is reflected by the mirror 13 in a direction generally normal to the axis 14 and impinges on a second mirror or prism 15.

Figure 1:
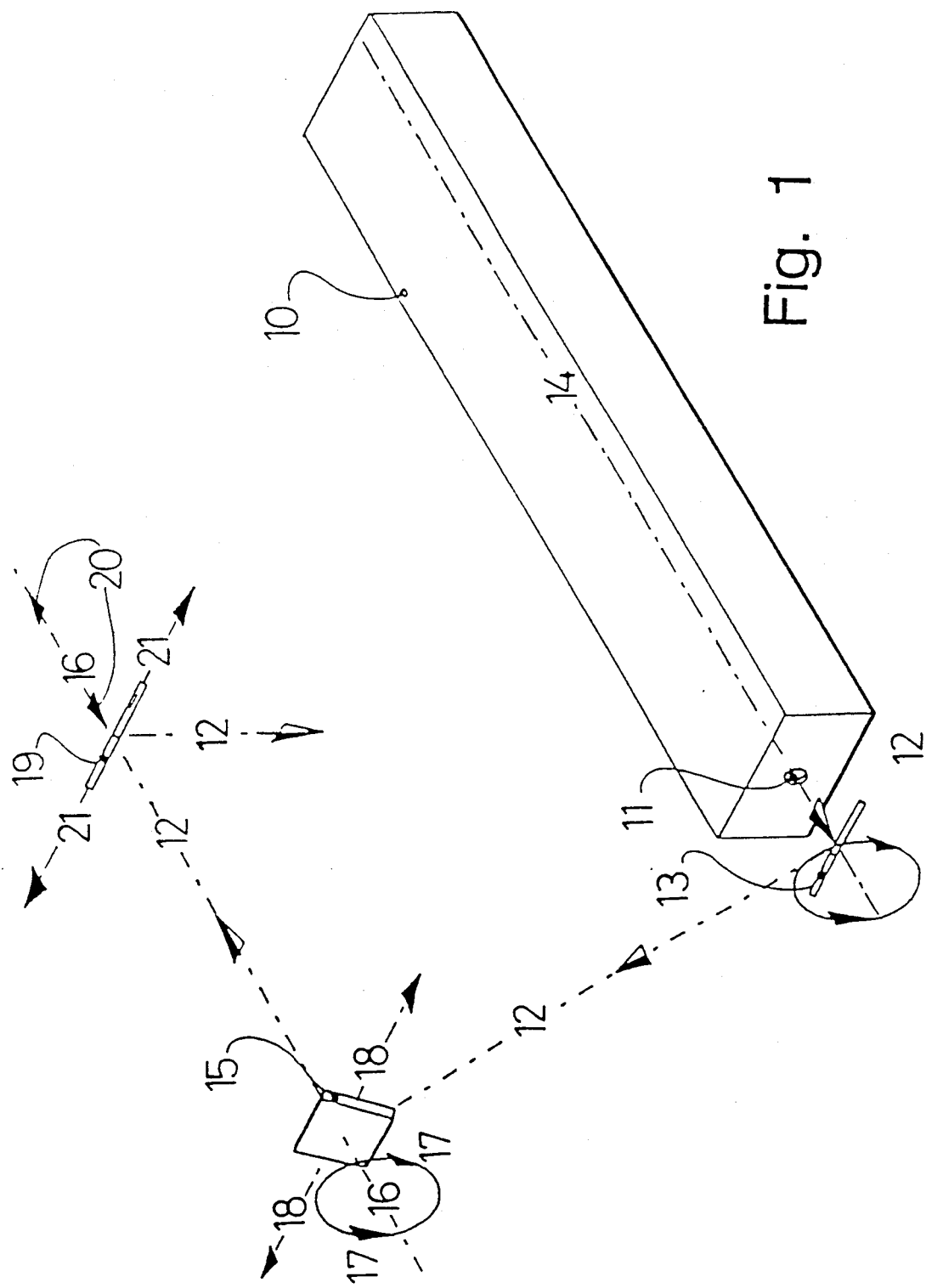
FIG. 1 is a systematic representation of the invention.

Mirror 15 is mounted for pivotal movement about an axis 16 spaced from and parallel to the axis 14, as indicated by arrow 17. Mirror 15 is also mounted for reciprocal movement transversely to the axis 16, as indicated by arrows 18. Mirror 15 reflects the beam 12 along the axis 16, the beam impinging on a third mirror or prism 19.

Mirror 19 is mounted for reciprocal movement along axis 16, as indicated by arrows 20, and is also mounted for reciprocal transverse movement with the second mirror 15, as indicated by arrows 21. Mirror 19 reflects the beam 12 in a direction normal to the axis 16, towards a work surface, not shown in FIG. 1.

Mirrors 13 and 15 are joined by a telescopic arm, not shown in FIG. 1 but described later, to ensure that the two mirrors pivot in synchronism, as mirrors 15 and 19 reciprocate transversely.

By this arrangement, the laser is maintained stationery while the beam is moved over the workpiece by the various pivotal and other movements of the various mirrors.

A focusing means is associated with the third mirror 19, to focus the beam on a workpiece.

Figure 2:
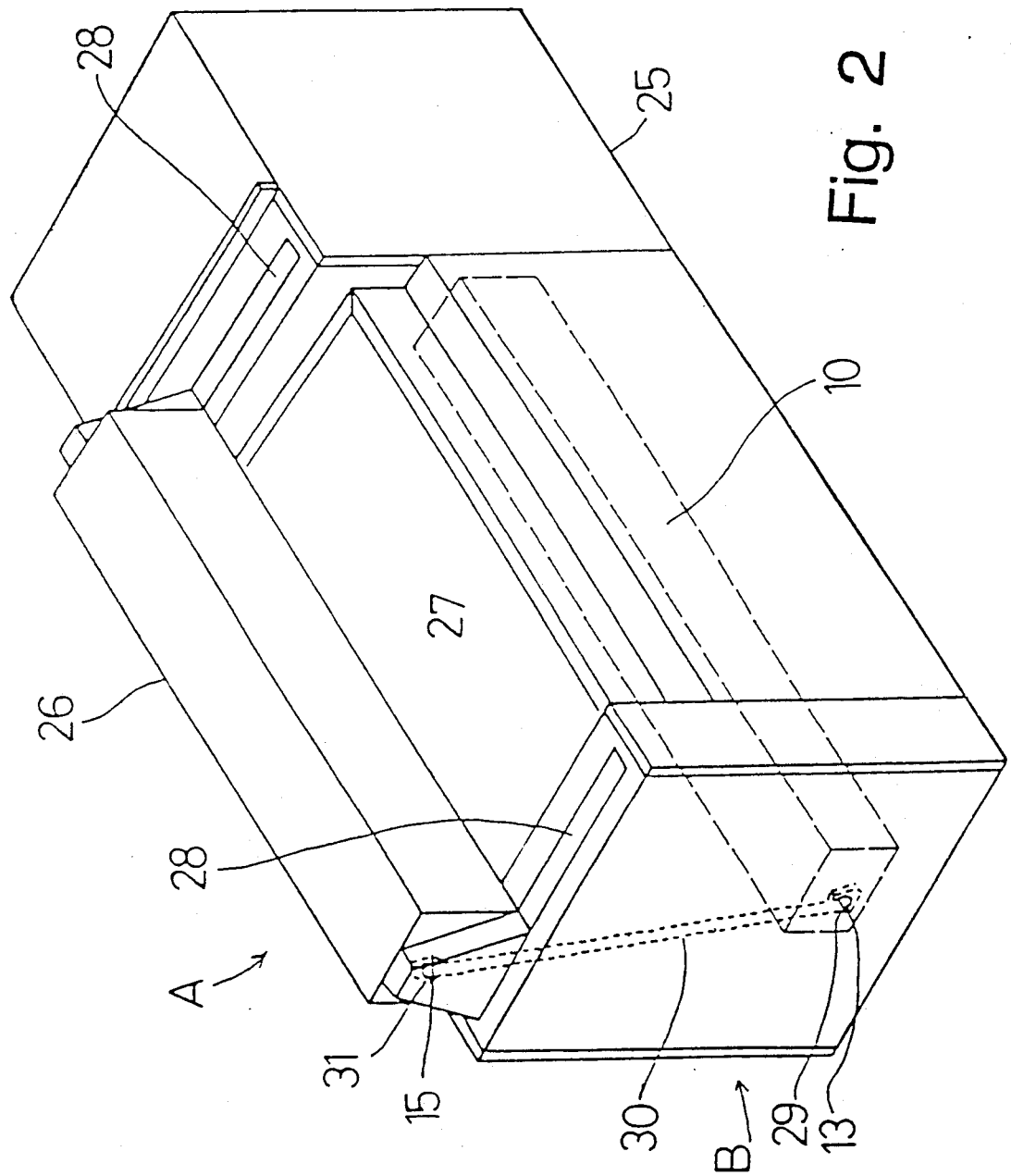
FIG. 2 is a perspective of one form of apparatus embodying the invention.

In FIG. 2, the laser 10 is shown mounted in a housing 25. The mirrors 15 and 19 are mounted in a further or upper housing 26 which can move backwards and forwards on housing 25 over a worktable 27. Tracks at 28 can be provided for the housing 26. Mirror 13 is mounted in a mounting member 29. The telescopic arm is indicated at 30 joining the mounting member 29 and a mounting member 31 holding mirror 15.

Figure 3:
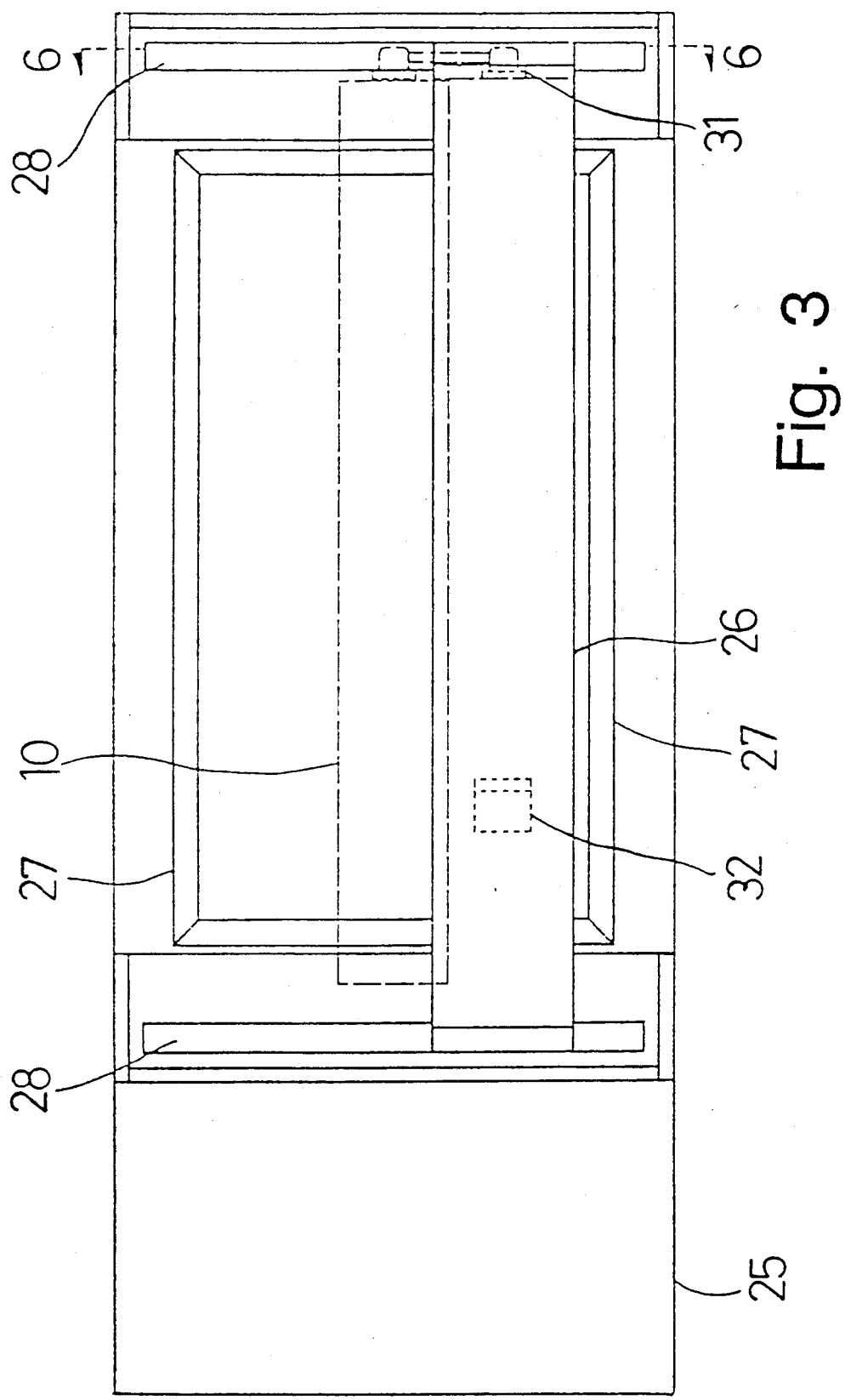
FIG. 3 is a top plan view of the apparatus in FIG. 2.
Figure 4:
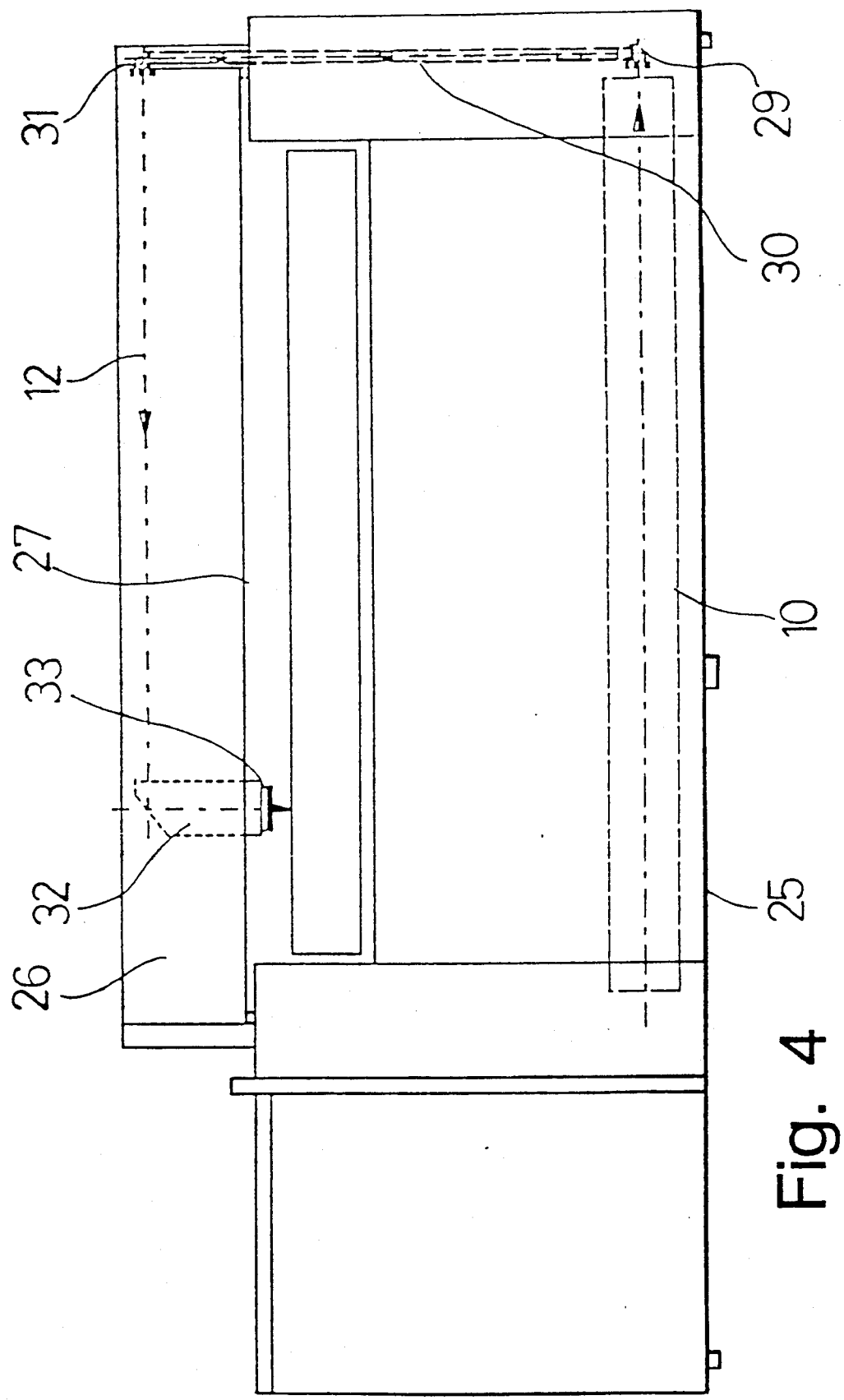
FIG. 4 is a front view of the apparatus of FIGS. 2 and 3, in the direction of arrow A in FIG. 2.

In FIG. 3, which is a top plan view, the upper housing 26 is shown moved rearward from its position as shown in FIG. 2. In FIG. 4, which is a side view, the mounting means 32 for mirror 19 is shown, together with the focusing means indicated at 33.

The focusing means 33 moves over a workpiece supported on the worktable 27, in close proximity to the surface of the workpiece. An arrangement for providing for correct positional relationship of the focusing means relative to the workpiece will be described later.

Figure 5:
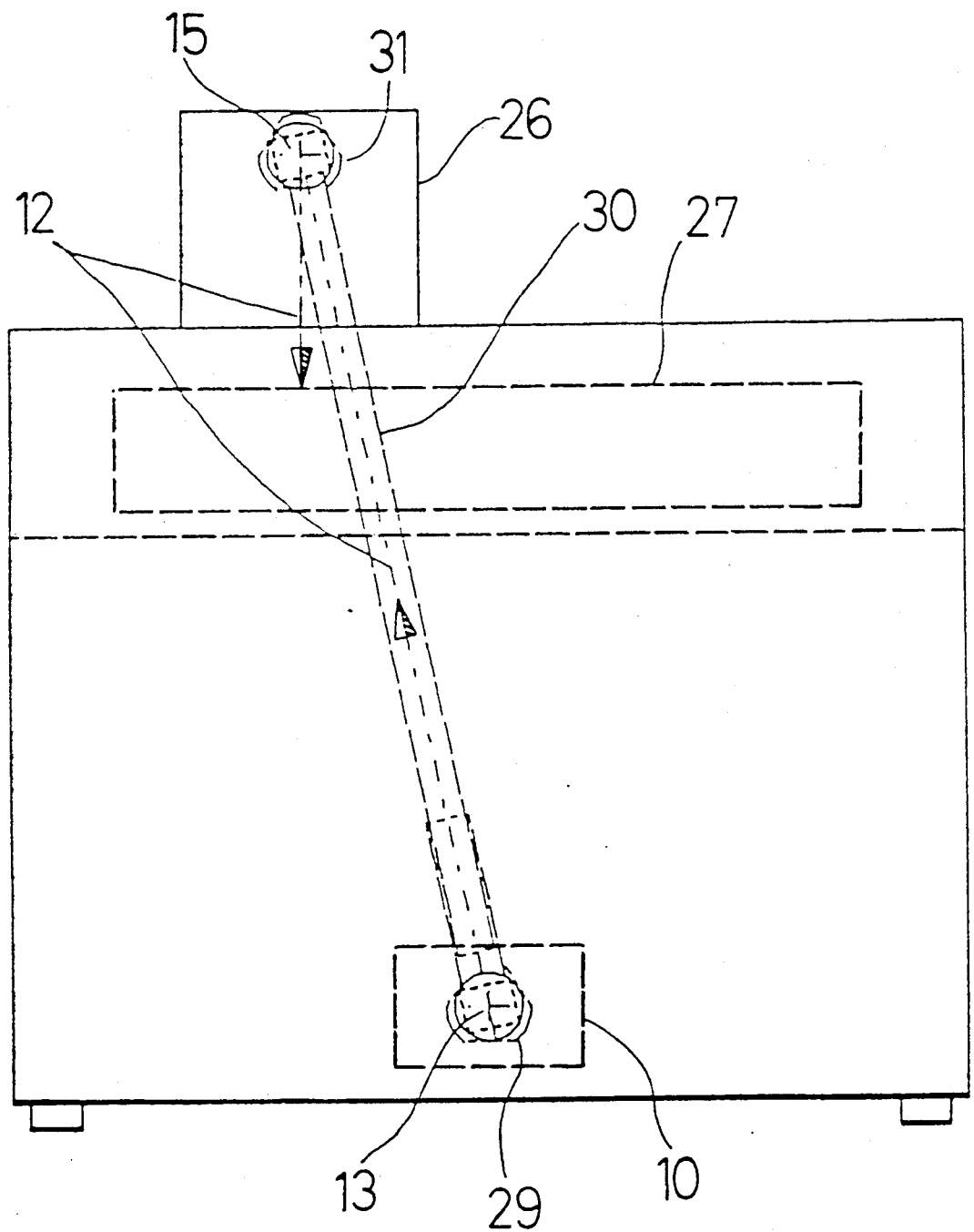
FIG. 5 is an end view in the direction of arrow B in FIG. 2.

In FIG. 5, an end view, the telescopic arm 30 is shown, joined at each end to the mounting members 29 and 31. By this means, as the upper housing 26 moves back and forth over the table 27, the telescope arm 30 pivots the mounting members 29 and 31 and thus the mirrors 13 and 15, to maintain the correct optical alignment. The beam conveniently can travel up through the arm 30.

In FIG. 5, other parts of the apparatus are omitted, this figure being intended to show clearly the telescopic arm 30 and its joining of the mounting members 29 and 31.

Figure 6:
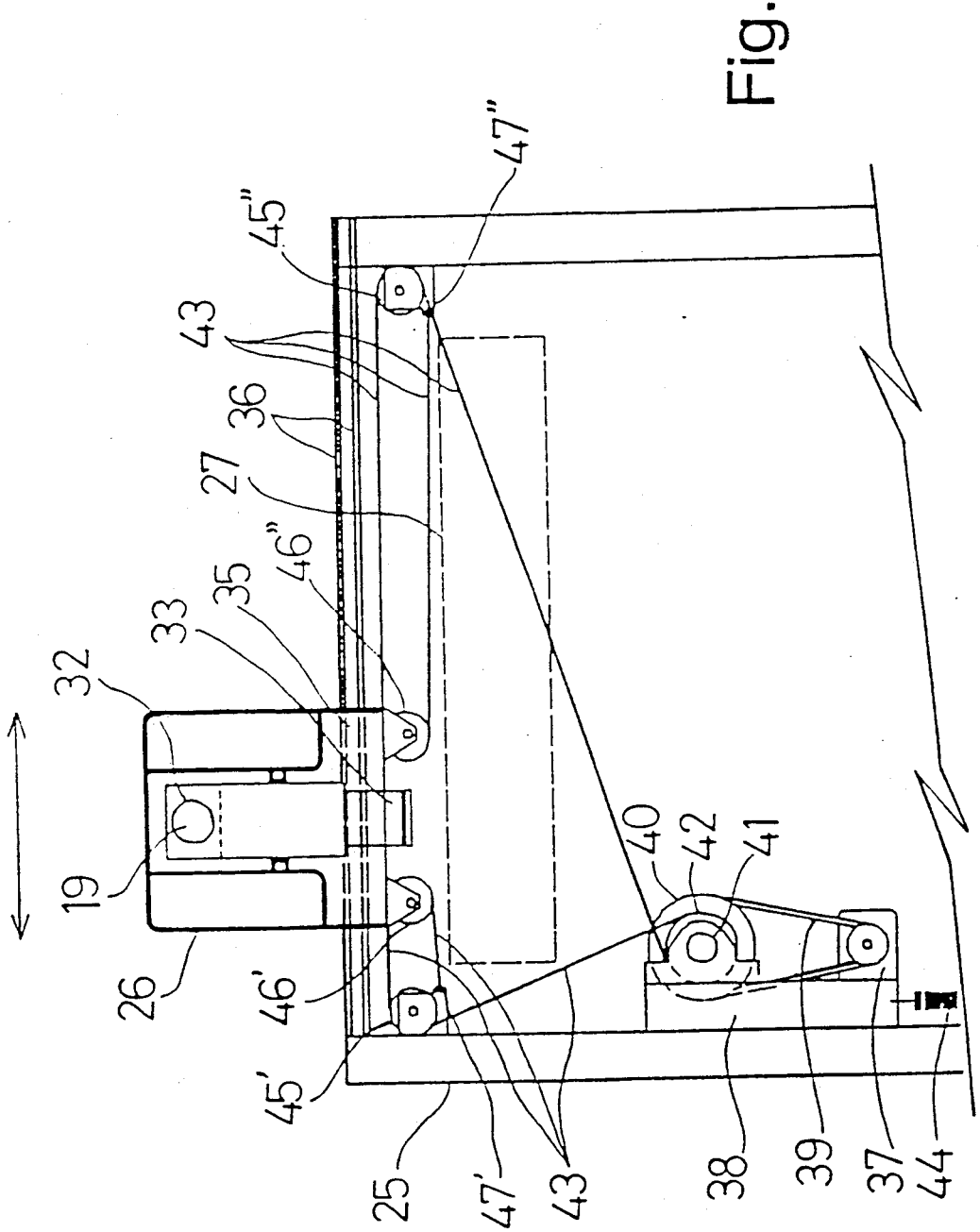
FIG. 6 is a cross section to an enlarged scale, on the line 6—6 of FIG. 3; of the upper portion of the apparatus.

FIG. 6 illustrates one form of arrangement for the transverse, or lateral, movement of the upper housing 26, with the mirrors 15 and 19. FIG. 6 illustrates the arrangement at one end the right hand end in FIG. 3, a similar arrangement also being provided at the other end.

The top housing 26 has laterally extending webs 35 extending on each side, the webs sliding between spaced slides 36 in the housing 25. A servo motor 37 is mounted on a support member 38, driving via toothed belt 39 a pulley 40 mounted on a shaft 41. Also mounted on the shaft 41 and rotatable with the pulley 40 is a drum 42. A flexible steel cable 43 is wound a small number of turns around the drum. The support member 38 can be slidably mounted on the housing 29, with a spring 44 acting to tension the cable 43.

At each side of the housing are mounted pulley 45' and 45" are two further pulleys 46' and 46" are mounted on the bottom of the top housing 26. One end of the cable 43 is attached to a fixed part 47', then passes around the pulley 46' around the pulley 45', around drum 42, across the housing 27 and around pulley 45", around pulley 46" on the upper housing 26 and then back to a second fixed part 47". Actuation of the motor will rotate drum 42 and this will wind the cable 43 in one direction or the other, depending upon the direction of rotation of the motor. This will move the top housing 26 across the housing 27 in one direction or the other. Limit switches can be provided to stop the top housing when it reaches either end of the slide 36.

Figure 7:
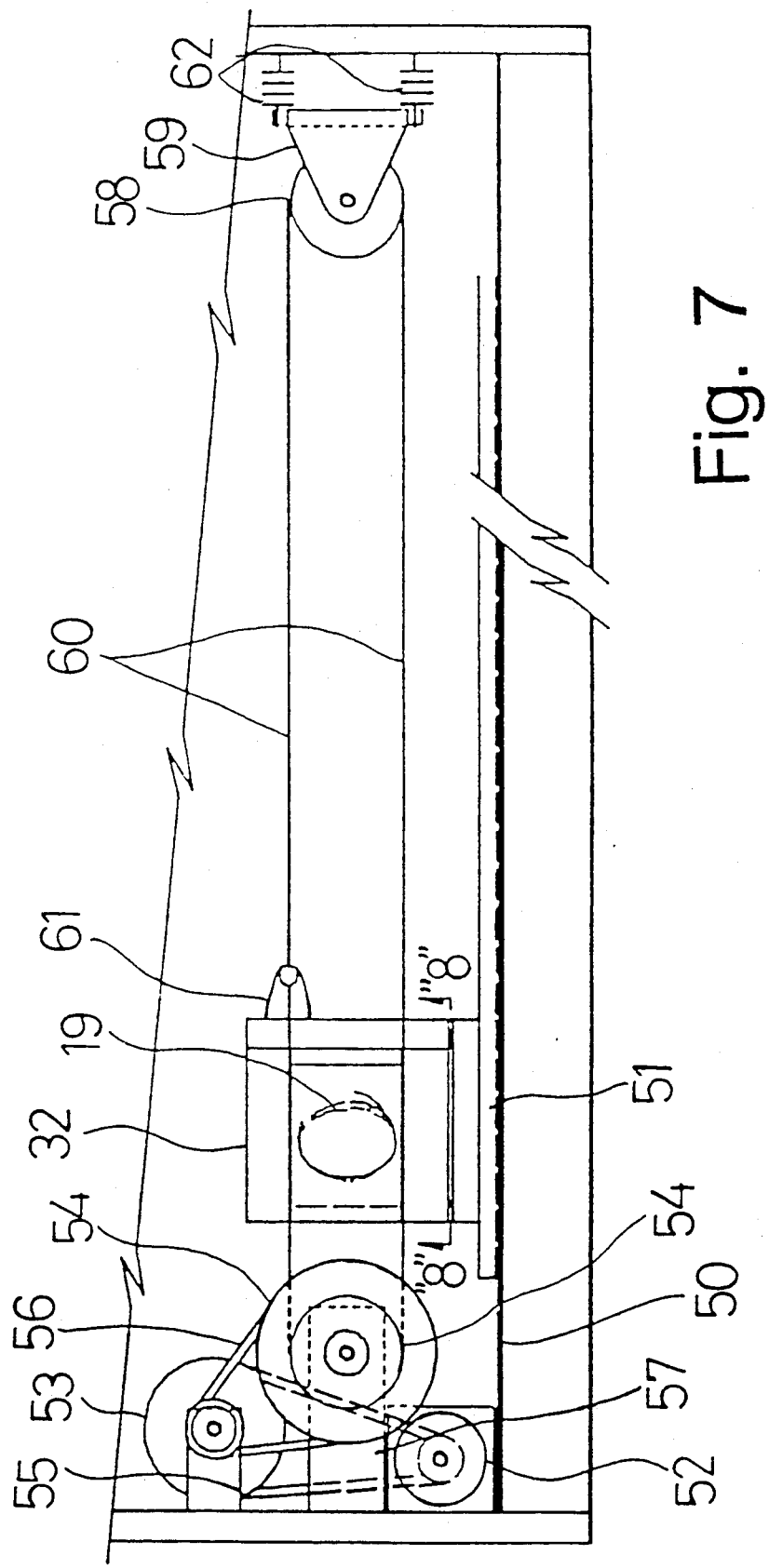
FIG. 7 is a partial top view to a larger scale showing the means for longitudinal movement of the third mirror.

FIG. 7 is a view on the upper surface of the top housing 26 at one end, for example the left hand end in FIG. 3, and illustrates an arrangement for moving mirror 19 and the lens system 33 along the top housing. The top housing has webs 50 extending from the front and back sides, the webs sliding in slides 51 mounted on the mounting means 32. A servo motor 52 drives, via reduction pulley system 53 a further pulley 54, via toothed belts 55 and 56. Pulley 54 is mounted on a bracket 57, on the top housing. A further pulley 58 is mounted on a further bracket 59 which is attached to the other end of the top housing 26 by means of springs 62. A flexible cable 60 is attached at one end to a position 61 on the mounting 32, of the mirror 19 and lens 33. The cable passes around pulley 58, back to and around pulley 54 and is then attached at its other end to the position 61. The cable is would a few times around pulley 54, which could be in the form of a drum. Actuation of the servo motor results in winding of the cable one way or the other, depending upon the direction of rotation of the motor and moves the mounting 32. Limit switches may also be provided to stop the movement of the mounting 32 when it reaches either end of the slides 51.

Figure 8:
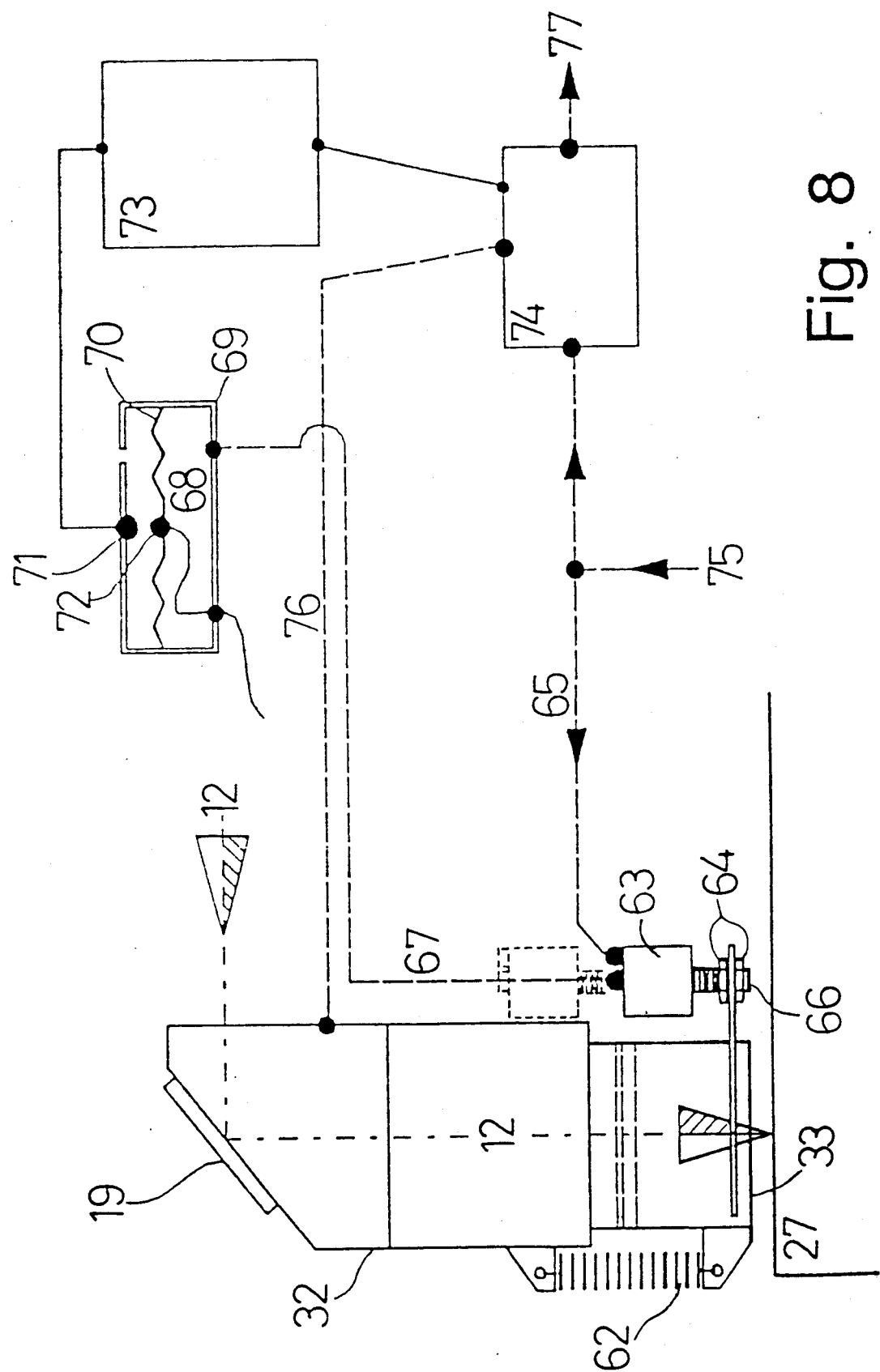
FIG. 8 is a cross-section on the line 8—8 of FIG. 7.

FIG. 8, illustrates the mounting 32, holding mirror 19 and the lens system 33. Mounting 32 is comprised of a pneumatic cylinder, piston and hollow rod assembly through which the laser beam passes. The relative movements of the piston and cylinder are controlled by a compressible fluid. This pneumatic cylinder assembly 32 is single acting whereby one or more spring(s) 62 causes it to react to its rest position. The side of the lens system 33 has a pneumatic proximity sensor 63 attached to it whose vertical height can be adjusted relative to the lens system 33 by means of the nuts 64. The sensor 63 moves up and down following the movements of the lens system 33 which is activated pneumatically. The fluid is supplied to the sensor 63 by the conduit 65. The nozzle 66 of the sensor 63 has an annular orifice concentrically surrounding a central orifice through which flows the fluid that arrives by conduit 65. This configuration causes the annular vein to be at negative pressure when pressure is developed in the central vein by pressurized circulating fluid. When the end of the nozzle 66 approaches a surface, the pressure in the annular vein will increase. The conduit 67 connects the annular vein with the chamber 68 of the switch 69. At a relative pressure, which can be set by raising or lowering the sensor 63 by means of the nuts 64, the diaphragm 70 deflects up sufficiently to close contacts 71 and 72. When contacts 71 and 72 are closed, an electric signal is sent to the electronic amplifier 73 that then activates the 3 solenoid valve 74 which is normally open. The reference to a 3 solenoid valve which is normally open means a valve with three orifices which, in the absence of an electric tension, connects conduit 75 to conduit 76. When an electric tension is applied to the 3 way valve 74, the said valve connects solely the conduit 76, to the open air orifice 77. As such, when the contacts 71 and 72 are open the pressure of the fluid acting on the piston causes the lens system 33 to descend towards the work surface 27. When the predetermined distance is attained, the contacts 71 and 72 close, causing the pressure to escape into the atmosphere and the lens system 33 to retract upward by means of the spring(s) 62. The lens system 33 is shown with dashed lines in its rest position.

The lens system and mirror 19, via the mounting 32, is moved over the worktable by actuation of the various motors moving the top housing 26 on housing 27 and the mounting 32 in the top housing 26. This movement is controlled by a computer programmed to produce a particular movement pattern of the laser beam over the workpiece. The worktable 27 can be of a grid like-form, onto which a further table can be put for holding flexible material as by suction. Rigid workpieces can be mounted directly on the worktable.

To prevent fumes, and dust, and other undesirable items entering into the top housing from below a flexible band can be positioned in the slides 51, the band extending on either side of the mounting 32 and moving in the slides with the mounting.

I claim:

1. A beam delivery apparatus, comprising:
   a laser (10) having an axis (14);
   a first reflecting means (13) at one end of the laser (10) and pivotal about the axis (14), said first reflecting means (13) adapted to reflect a laser beam normal to the axis (14);
   a second reflecting means (15) aligned with the first reflecting means (13), pivotal about a further axis (16) spaced from and parallel to the axis (14), the second reflecting means (15) adapted to reflect the beam along the further axis (16), means (29) mounting the second reflecting means (15) for lateral movement normal to the further axis (16);
   a telescopic means, (30) joining the first and second reflecting means (13, 15), to pivot said reflecting means (13, 15) in unison as the second reflecting means (15) moves laterally;
   a third reflecting means (19) aligned with the second reflecting means (15), means mounting (26) the third reflecting means (19), for lateral movement with the second reflecting means (15), means mounting the third reflecting mounting means for (19) for reciprocal movement along the further axis (16), towards and away from the second reflecting means (15).

2. An apparatus as claimed in claim 1 including focusing means (33) associated with the third reflecting means (19) for focusing the beam on a workpiece.

3. An apparatus as claimed in claim 2 comprising a main housing (25), said laser (10) mounted in said main housing (25);
   an upper housing (26) supported on said main housing (25) for movement in a direction normal to said laser axis (14);
   mounting means (31) at one end of said upper housing (26) for said second reflecting means (15) and mounting means (32) supported in said upper housing (26) for said third reflecting means (19) and said focusing means (33);
   said telescopic means (30) being connected at one end thereof to said mounting means (31) and at its other end to a mounting means for said first reflecting means (13).

4. An apparatus as claimed in claim 1, wherein said telescopic means (30) is hollow and aligned with the axis of the beam between the first and second reflecting means (13, 15), whereby the beam passes through the telescopic means (30).

5. An apparatus as claimed in claim 3, including means for supporting (32) said focusing means (33) in a predetermined distance from a surface of a workpiece.

6. An apparatus as claimed in claim 1, wherein said first and second reflecting means (13, 15) include means for pivotally and rotatably mounting each of said reflecting means (13, 15), said telescopic means (30) being operatively associated with said first and second reflecting means (13, 15) whereby rotation of one of said first and second reflecting means (13, 15) effects corresponding rotation of the other of said reflecting means through said telescopic means (30).

7. An apparatus as claimed in claim 1, wherein said telescopic means (30) comprises at least one fixed segment operatively secured to said first or second reflecting means (13, 15) and at least one movable segment fixedly secured to the other of said first and second reflecting means (13, 15).

8. An apparatus as claimed in claim 3, wherein said second reflecting means (15) is mounted within said upper housing (26) whereby movement of said upper housing (26) effects movement of said second reflecting means (15) whereby said telescopic means (30) translates the movement of said second reflecting means (15) to said first reflecting means (13).

9. An apparatus as claimed in claim 3, including a sensing means system for sensing the distance of said focusing means (33) of the beam delivery apparatus above a workpiece to be subjected to the action of said beam.

10. An apparatus as defined in claim 9, wherein said sensing system includes a sensor 63, pneumatic movement means (32) for movement of said focusing means (33), pneumatic switch means (69) generating an electrical output signal, amplifying means (73) for receiving said output signal, said amplifying means (73) generating an output control signal, and actuating means (74) for controlling said pneumatic means (32) for movement of said focusing means (33).

11. An apparatus as claimed in claim 9, wherein said sensing system further includes means for creating a differential air pressure (65) between said pneumatic movement means (32) and a workpiece; means for sensing a difference in the air pressure or resistance of the air pressure, and means for comparing values generated by said means for sensing a difference in the air pressure to actuate movement of said focusing means (33) in response to a change in distance between said focusing means (33) and said workpiece.

12. An apparatus as claimed in claim 10, wherein said sensing system includes means (65) for supplying a fluid flow to said sensor (63); means (67) for feeding fluid from said sensor; and means for measuring a difference between fluid flow to said sensor and fluid flow from said sensor.

13. In a sensing system for sensing the distance of a focusing means (33) of a beam delivery apparatus above a workpiece to be subjected to the action of a laser beam the improvement wherein said sensing system comprises pneumatic means (32) adapted to be associated with said focusing means (33); means 65 for supplying a fluid flow to a sensor means 63, means 67 for feeding fluid from said sensor means 63; sensor means for sensing a difference between fluid flow to said sensor means 63 and fluid flow from said sensor means 63; and means for comparing values generated by said sensor means 63 for sensing a difference in the air pressure to actuate movement of said focusing means (33) in response to a change in distance between said focusing means (33) and a workpiece.

14. A sensing system as defined in claim 13, including means for generating an output signal to be received by a controller.

15. A sensing system as defined in claim 12, including controller means for receiving said signal, said controller means being effective to generate an output signal to actuate means for effecting movement of said focusing means (33).

16. A sensing system as defined in claim 13, including pneumatic movement means (32) for movement of said focusing means (33), pneumatic switch means (69), for generating an electrical output signal, amplifying means (73) for receiving said output signal, and generating an output control signal, and actuating means responsive to said output control signal.

* * * * *